INVENTOR
Joseph D. Richard

INVENTOR
Joseph D. Richard

INVENTOR
Joseph D. Richard

United States Patent Office 3,417,369 Patented Dec. 17, 1968

3,417,369

PULSE ECHO RECORDING

Joseph D. Richard, 3613 Loquat Ave., Miami, Fla. 33133

Continuation-in-part of application Ser. No. 353,171, Mar. 19, 1964. This application Aug. 23, 1967, Ser. No. 662,629
4 Claims. (Cl. 340—3)

ABSTRACT OF THE DISCLOSURE

Apparatus for graphically recording pulse echo signals wherein a fiber optic cathode ray tube and direct print photosensitive paper are used in place of the conventional mechanical stylus system. The high writing speed and random triggering capabilities make possible several unique applications.

This application is a continuation-in-part of the copending patent application Ser. No. 353,171, filed Mar. 19, 1964, and now Patent No. 3,339,543.

This application relates to the graphic recording of signals from echo ranging systems, more particularly, the the present invention is directed to pulse echo recording apparatus having greatly improved characteristics and capabilities over the prior art.

In the past, pulse echo recorders have consisted of a mechanical stylus traveling repetitively across a paper strip; means for triggering a transmitted pulse as the stylus passes the reference edge of the paper; and means for marking the paper coincident with received echoes so that the lateral displacement of the mark is proportional to the distance to a reflecting object. These pulse echo recorders have been limited by several disadvantages and problems because of the inherent limitations of the mechanical stylus systems.

It is the principal object of the present invention to provide pulse echo recording apparatus which overcomes those operational limitations in the prior art which were concomitant with the use of mechanical styli.

The present invention provides a pulse echo recording system in which a specially adapted cathode ray tube replaces the conventional mechanical stylus. Triggering, gating, and range marks are provided by clock pulses divided down from a reference oscillator frequency which is proportional to the velocity of sound in the medium. The high resolution and precision timing capabilities of the system make possible a high degree of accuracy on a relatively narrow recording paper. Corrections for variations of sound velocity in the medium are easily made by adjustment of the reference oscillator frequency. The high writing speed capabilities of the cathode ray tube provide high resolution recording of fish echoes and the like with the delayed and expanded sweep mode of operation. The random triggering capabilities of the cathode ray tube allows the system to be used as a net depth recorder simultaneous with normal use in addition to other special purpose applications.

Other objects and advantages of the present invention will become more apparent from the following specification and claims in which:

Figures 1, 2, 3:
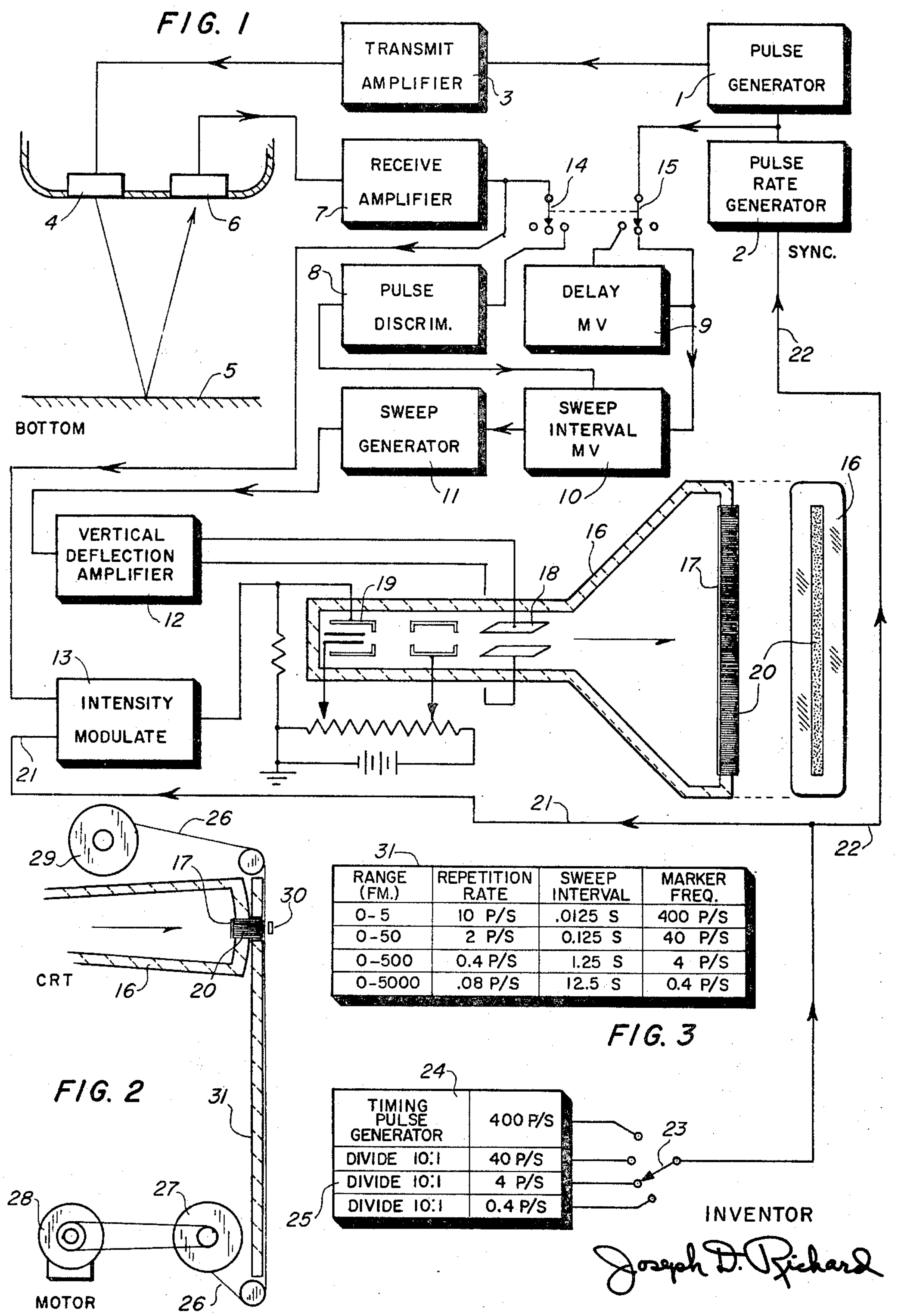
FIGURE 1 is a schematic and block diagram of a pulse echo recording system according to the present invention.
FIGURE 2 is a top view of the graphic recorder used with the apparatus of FIGURE 1.
FIGURE 3 shows the pulse characteristics of the appartus of FIGURE 1 for various depth ranges.

In FIGURE 1 a repetitive trigger pulse scource 2 is shown having an output synchronized with the pulses from the timing pulse source 25. The various timing pulse sources, such as 25, are divided down by steps of ten from the reference timing pulse generator 24. The frequency of the timing pulse generator 24 is proportional to the velocity of sound in water and its frequency may be adjusted correspondingly. For example, the output frequency should be 400 pulses per second for an expected sound velocity of 800 fathoms per second when the depth is to be read in fathoms. Coincident with a trigger pulse from the pulse rate generator 2, a suitable electrical pulse is generated by the pulse generator 1 which is amplified by the transmit amplifier 3. A pulse of acoustic energy corresponding to the amplified electrical pulse is transmitted into the water by means of the transmitting tranducer 4. Acoustic signals reflected from the ocean bottom 5 are picked up by the receiving transducer 6 and the corresponding electrical signals are amplified by the receiving amplifier 7. The amplified received signals drive the intensity modulator 13 so that the intensity of the electron beam of the cathode ray tube 16 is proportional to the intensity of acoustic signals received by the transducer 6. The trigger pulses from the pulse rate generator 2 are also used to trigger the sweep interval multivibrator 10. The duration of the output pulse of the multivibrator 10 determines the display interval of the cathode ray tube 16. The sweep generator 11 produces a triangular wave which drives the vertical deflection amplifier 12. The electron beam of the cathode ray tube 16 is thus deflected in a substantially linear manner so that the displacement along the faceplate can be used as a measure of elapsed time. Since the sweep is initiated at the same instant that the acoustic pulse is transmitted, and since the received echoes are used to intensity modulate the electron beam, the elapsed time interval may be represented by a scaled distance along the faceplate with a zero reference at the point of origin. A fiber optic matrix 20 is mounted within the faceplate of the cathode ray tube 16. A phosphor 17 coats the inner surface of the fiber optic matrix 20. As a first alternate mode of operation, the switch 15 may be used to pass trigger pulses into the delay multivibrator 9 to provide a delayed sweep. As a second alternate mode of operation, the switch 15 may be used to exclude trigger pulses from the sweep interval multivibrator 10. In this second alternate mode of operation, the switch 14 passes the amplified received signals to the pulse discriminator 8 so that when a suitable signal is detected, the output of the pulse discriminator 8 triggers the sweep interval multivibrator 10. Several specific applications for this mode of operation are described herein.

FIGURE 2 shows a top view of the cathode ray tube 16. A roll 29 of photosensitive paper 26 is pulled along past the outer surface of the fiber optic matrix 20 by means of the motor 28 and takeup roll 27. The photosensitive emulsion on the paper strip 26 is thus exposed by the light output of the phosphor 17 when activated by the electron beam. In a preferred use of the present apparatus, a thin base, substantially translucent paper is used with the emulsion side facing outward. Adequate exposure of the emulsion is obtained by light penetrating the thin base paper. A reflecting surface 30, in contact with the emulsion surface, redirects any light which penetrates both paper and emulsion back onto the emulsion to increase light utilization. Although the record image contrast provides more than adequate readability, it can be improved further by the use of an electroluminescent panel 31 behind the viewing area.

FIGURE 3 shows a tabular diagram 31 giving typical pulse repetition rates, sweep intervals, and marker frequencies for various depth ranges.

Figure 4:
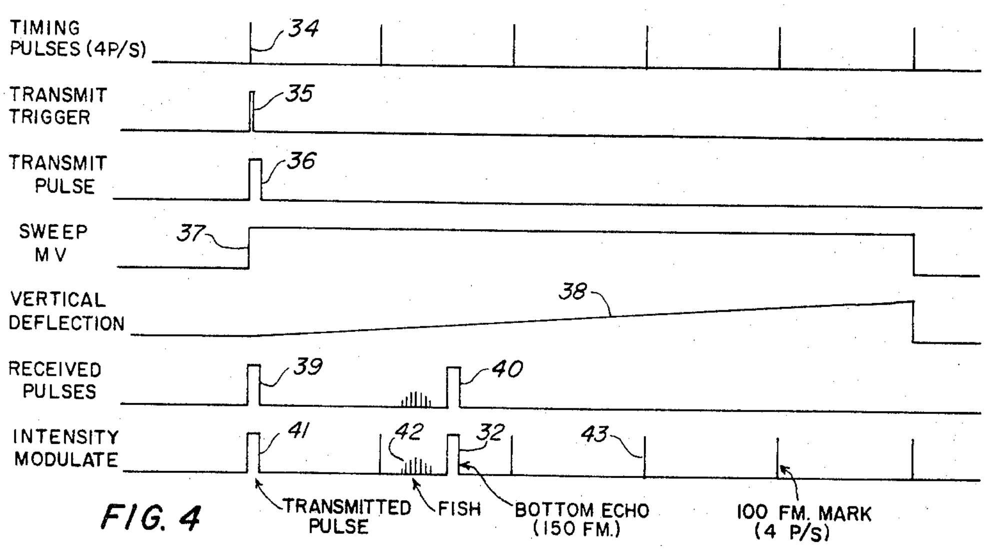
FIGURE 4 shows the time sequence of pulses generated by the apparatus of FIGURE 1.

FIGURE 4 shows the time sequence of pulses for the operation of the apparatus of FIGURE 1 with the switches 14 and 15 in the normal position as shown. Timing pulses 34 of 4 p./s. are shown which correspond to a sound velocity of 800 fathoms per second. These pulses are divided down in steps of ten to one from the basic clock pulse frequency of 400 p./s. as shown in FIGURE 1. The 4 p./s. pulses 34 are used as time marker pulses and also to synchronize the pulse rate generator 2 to generate the transmit trigger pulse 35. The resulting transmit pulse 36 corresponds in time and duration to the acoustic pulse transmitted into the water. The sweep multivibrator output 37 is also initiated by the transmit trigger pulse 35. The vertical deflection triangular waveform 38 deflects the electron beam across the full length of the faceplate with a sweep interval of 1.25 seconds. The received signals are the direct pulse 39, the bottom reflected pulse 40, and intermediate fish echoes. The output pulses from the intensity modulator 13 include the direct pulse 41, the bottom echo 32, a series of 4 p./s. timing pulses 43, and fish echoes 42 immediately above the bottom. The timing pulses 43 are used as 100 fathom marks so that the depth of reflecting objects may be determined by the displacement of the echo pulses, such as 42 and 32, from the sweep origin.

Figure 5:
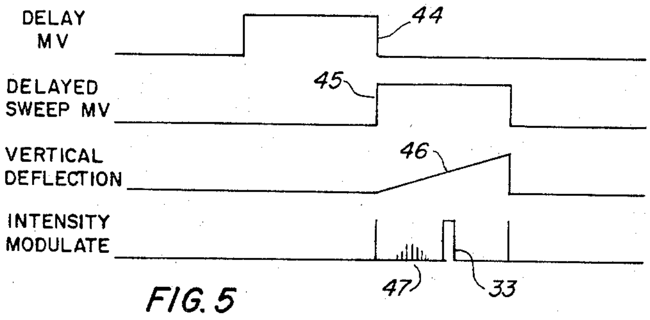
FIGURE 5 shows the time sequence of pulses for the delayed sweep mode of operation.

FIGURE 5 shows the time sequence of pulses when the delayed sweep mode of operation is used. Transmit trigger pulses from the pulse rate generator 2 are passed to the delay multivibrator 9 by means of the switch 15. The sweep interval is thus initiated a predetermined time after the trigger pulse occurs. The sweep multivibrator output pulse 45 is initiated at the termination of the delay multivibrator output pulse 44. The vertical deflection triangular wave 46 occurs coincident with the sweep multivibrator pulse 45 as described previously. The output pulses from the intensity modulator include the bottom echo 33 and fish echoes 47.

Figure 6:
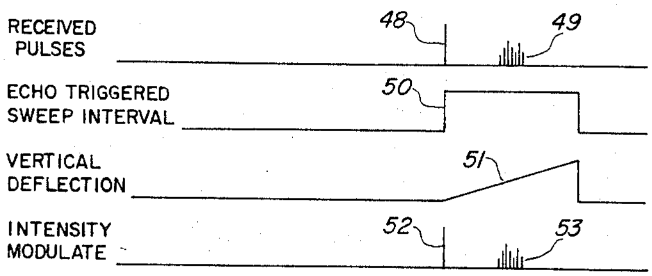
FIGURE 6 shows the time sequence of pulses for the surface echo triggered sweep mode of operation.

FIGURE 6 shows the time sequence of pulses when the sweep interval is initiated by a received pulse. For this mode of operation the switch 14 in FIGURE 1 passes signals from the receive amplifier 7 to the pulse discriminator 8. The pulse discriminator 8 triggers the sweep multivibrator 10 only when suitable pulses are detected from the receive amplifier. The switch 15 disconnects the output of the pulse rate generator 2 from the sweep interval multivibrator 10 so that the display sweep is not activated when a pulse is transmitted as described previously.

Figure 8:
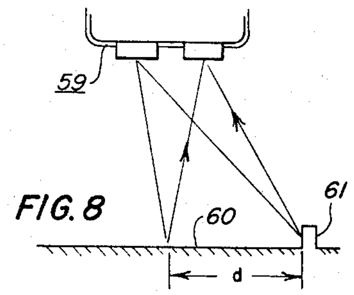
FIGURE 8 shows schematically the operation of the bottom echo triggered sweep for the side scan mode of operation.
Figure 9:
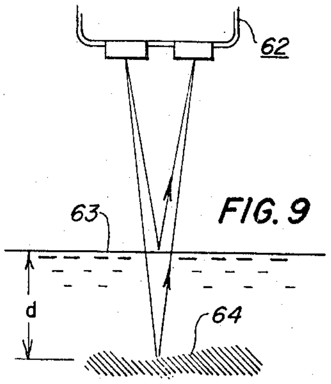
FIGURE 9 shows schematically the operation of the surface echo triggered sweep for the subsurface mode of operation.

FIGURE 9 shows schematically a pulse echo system 62 above a reflecting surface 63 detecting energy reflecting objects 64 below the surface. Viewing FIGURES 6 and 9 together it may be seen that the echo 48 from the reflecting surface 63 triggers the sweep interval pulse 50 which triggers and coincides with the vertical deflection triangular wave 51. Intensity modulate pulses include the surface 63 reflected pulse 52 and subsurface object 64 reflected pulses 53. Applications of this echo triggered sweep mode of operation include: (1) recording reflected electromagnetic energy from dense shoals of fish such as anchoveta or menhaden from an aircraft using laser pulse echo equipment, (2) recording reflected acoustic energy from objects beneath the sea bottom using acoustic pulse echo equipment operating at or near the sea surface, and (3) recording reflected acoustic energy from objects laterally disposed on the sea bottom by side scanning pulse echo equipment as shown schematically in FIGURE 8. In the foregoing, a received echo is used to trigger the recorder sweep. As an alternative, this recording mode may also be used to record depth information by acoustic link telemetry from a trawl net or the like. In this application pairs of pulses are received from the trawl wherein the depth information is encoded in the time interval between the pulses of each pair. The first pulse of the pair triggers the recorder sweep through the pulse discriminator circuit in the manner described previously, and the second pulse is recorded by intensity modulation of the electron beam.

Figure 7:
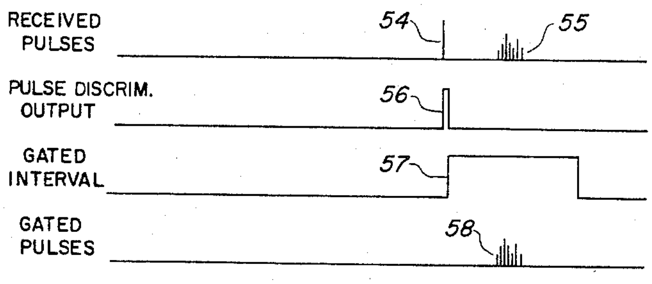
FIGURE 7 shows the time sequence of pulses for the surface echo triggered gate mode of operation.

FIGURE 7 shows the time sequence of pulses for another alternate mode of operation wherein a surface reflected pulse is used to initiate a gate period during which subsequently received signals are allowed to intensity modulate the electron beam. Apparatus is shown schematically in FIGURE 15 for providing pulse echo signals recorded in this mode. The surface 87 reflected pulse 54 is detected by the pulse discriminator 91 and the resulting output pulse 56 triggers the display interval multivibrator 92 to generate the gate pulse 57. Signals from the receive amplifier 90, such as the fish echoes 55, pass through the gate 93 only for the duration of the gate pulse 57. The gated pulses 58, corresponding to the received fish echoes 55, intensity modulate the electron beam of the fiber optic cathode ray tube. In this mode of operation there is no triangular wave time base.

FIGURE 8 shows schematically a pulse echo system 59 for side scan wherein the graphic recorder sweep is initiated by the echo from the sea bottom 60. In actual practice, this type of sonar directs the main beams of acoustic energy out laterally to port and starboard and only the side lobes of the beams strike the bottom directly beneath the ship. However, because of the proximity of the bottom relative to the laterally disposed targets on the bottom and because of the normal incidence of the reflected energy, the bottom echo is easily detected and used to trigger the sweep interval as shown in FIGURE 6. Obviously, a nonlinear sweep is preferred for this application. A further improvement would include means for continuously varying the sweep waveform characteristic as a function of the water depth.

FIGURE 9 shows schematically a pulse echo system 62 for pulse echo detection of subsurface objects from above the surface. A reflected pulse from the surface 63 triggers the sweep interval after which subsequent echoes, such as from the subsurface object 64, are graphically recorded by intensity modulation of the electron beam as described previously.

Figure 10:
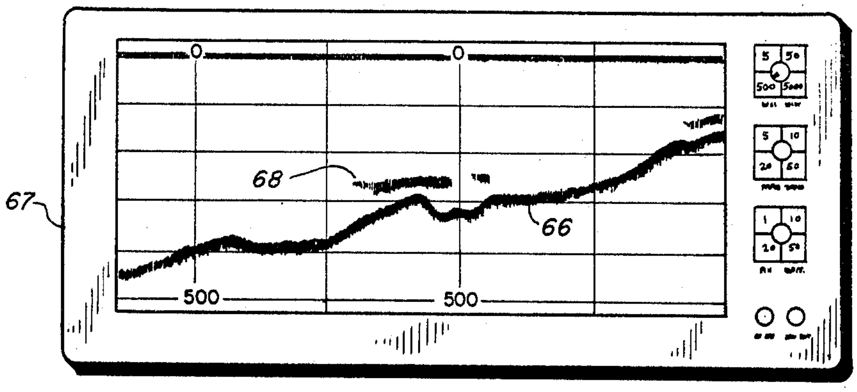
FIGURE 10 shows a front view of the pulse echo recording apparatus.

FIGURE 10 shows an exterior view 67 of a pulse echo recorder according to the present invention. The graphic record shows the surface reference mode of operation as shown and described in FIGURES 1 and 4. The depth of the bottom profile 66 is read relative to zero reference at the upper margin of the recording paper in the conventional manner. A fish shoal 68 above the bottom is also shown.

Figures 11, 12, 13, 14, 15:
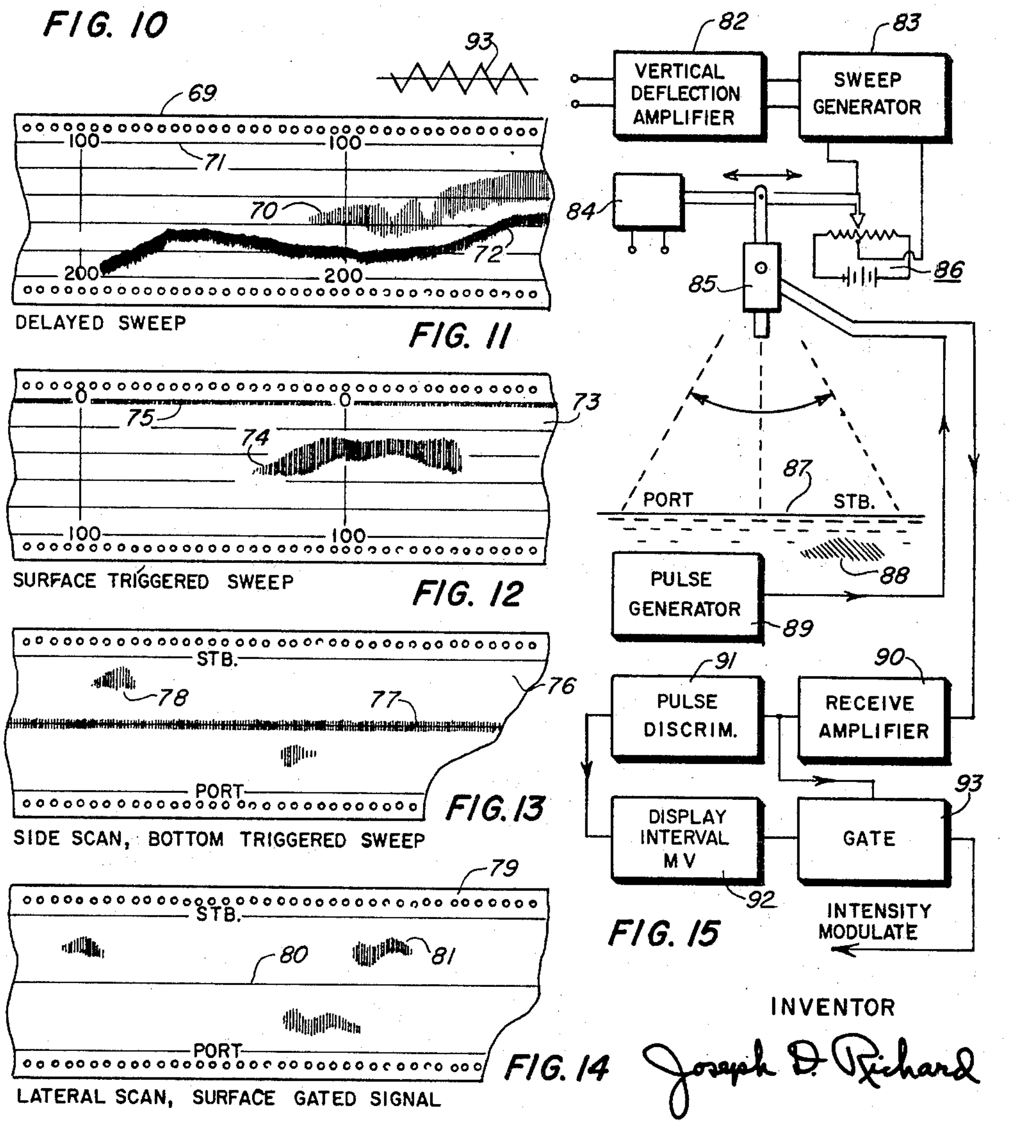
FIGURE 11 shows a typical pulse echo record for the delayed sweep mode of operation.
FIGURE 12 shows a typical pulse echo record for the surface echo triggered sweep mode of operation.
FIGURE 13 shows a typical pulse echo record for the side scan bottom echo triggered sweep mode of operation.
FIGURE 14 shows a typical pulse echo record for the lateral scan surface echo gated signal mode of operation.
FIGURE 15 shows schematically and in block diagram the apparatus for laterally scanning wherein the surface echo initiates a gate period for passing subsurface reflected signals to the intensity modulator.

FIGURE 11 shows a graphic record 69 obtained using the delayed sweep mode of operation as shown and described in FIGURES 1 and 5. The upper margin 71 represents the termination of the delay period and the initiation of the sweep delay period. The total depth interval recorded is 100 fathoms to 200 fathoms. A fish shoal 70 is shown above the sea bottom 72.

FIGURE 12 shows the surface echo triggered sweep mode of operation as shown and described in FIGURES 1 and 6. The received surface echo initiates the sweep at the reference margin 75. Subsurface echoes, such as from the fish shoal 74, are graphically recorded by intensity modulation of the electron beam as described previously.

FIGURE 13 shows a graphic record 76 obtained by side scan sonar techniques. The electron beam sweeps alternately up and down from the center position as triggered by bottom reflections from the acoustic pulses being transmitted alternately to port and starboard.

FIGURES 14 and 15 show a graphic record 79 showing subsurface echoes 81 displayed in plan position detected by the laterally scanning apparatus of FIGURE 15. A highly directional, rapidly pulsed laser transmitter 85, 89 and associated receiver 85, 90 is scanned laterally as shown from above the surface 87 of the sea. A laser generating pulses of energy in the green portion of the visible spectrum is preferred. The scan drive motor 84 also drives a sawtooth voltage source 86 which drives the sweep generator 83 and the vertical deflection amplifier 82. The electron beam of a cathode ray tube is deflected by the sawtooth waveform 93 so that it sweeps up and down relative to a center reference position as shown. Each pulse of electromagnetic energy reflected from the surface 87 is detected by the pulse discriminator 91 so that the display interval multivibrator 92 is triggered to open the gate 93. Thus for a predetermined time interval after the surface echo is received, subsequently received echoes from beneath the surface (such as from the fish shoal 88) are allowed to pass through the gate 93 and to intensity modulate the electron beam. The pulse sequence is shown in FIGURE 7. Thus the position of the electron beam across the paper 79 is synchronized with the lateral scan drive 84 so that the plan position of subsurface reflecting objects is shown to port and starboard of the centerline 80 representing the track of the aircraft. At the present time the penetration of laser energy into seawater is limited to a few hundred feet. This pulse echo recording configuration would be useful for locating large shoals of fish (such as anchoveta or menhaden) when they are near the sea surface. A relatively low speed aircraft would be desirable for this purpose.

It may be readily seen therefore that the above described pulse echo recording apparatus provides many advantages over the prior art. The photosensitive recording paper used with the pulse echo recorder develops a visible trace without the need for chemical treatment. Several varieties of direct print paper are commercially available and they are commonly used with mirror galvanometer type graphic recorders. Some of these photographic papers are particularly sensitive to ultraviolet light. The wavelength of the light emission of the phosphor should correspond to the peak sensitivity of the photosensitive paper. If the latent image is heated to about 250° F. followed by exposure to strong light, the image can be made visible within a few seconds. A heater element may be used to heat the exposed section of the recording paper before latensification by the ambient light. As an alternative, a suitable light source can be used to illuminate the paper record to further increase the rate of image latensification.

Although preferred forms of the invention have been described and illustrated herein, it will be understood that the invention may be embodied in other forms coming within the scope and meaning of the appended claims. Although acoustic echo ranging systems have been described for purposes of illustration, it should be understood that electromagnetic energy may be used as an alternative. The extremely high writing speed of the fiber optic cathode ray tube recorder makes it possible to graphically record the distance to reflecting objects in the atmosphere or in space by the transmission and reception of electromagnetic energy. Another example is the use of electromagnetic energy from a laser source, as described herein, to detect reflecting objects within the ocean from above the surface of the ocean.

What is claimed is:

1. Apparatus for graphically recording the distance to energy reflecting objects in a medium comprising: means for transmitting a pulse of energy into a medium; means for receiving energy pulses from within the aforementioned medium resulting from reflections of the said transmitted pulse; a cathode ray tube having an elongated faceplate and means for deflecting an electron beam along the axis of the said faceplate in response to a triangular wave; a sweep generator having a triangular wave output of predetermined duration; means for triggering the said sweep generator in a predetermined time relationship with the said energy pulse transmission; means for intensifying the electron beam current of the said cathode ray tube coincident with the said received energy pulses; an elongated fiber optic matrix within the said cathode ray tube faceplete, the said matrix being disposed along the sweep axis of the aforementioned electron beam; a luminescent phosphor material covering the inner surface of the said fiber optic matrix and emitting light when excited by the aforementioned electron beam; an elongated paper strip having a photosensitive surface disposed against the outer surface of the said fiber optic matrix, a spot image being thereby printed on the said paper when the aforementioned electron beam is intensified, the lateral displacement of which is a record of the distance to a reflecting object in the aforementioned medium; and means for moving the said paper across the outer surface of the said fiber optic matrix.

2. Apparatus as described in claim 1 further characterized by: means for initiating a delay interval coincident with said energy pulse transmission, the said sweep generator being triggered coincident with the termination of the said delay interval.

3. Apparatus for graphically recording the distance from the surface of a medium to reflecting objects below the surface of the said medium comprising: means for transmitting a pulse of energy into a medium from above the surface of the said medium; means for receiving energy pulses from the said medium resulting from reflections of the said transmitted pulse from the surface of the said medium and from objects within the said medium; a cathode ray tube having an elongated faceplate and means for deflecting an electron beam along the axis of the said faceplate in response to a triangular wave; a sweep generator having a triangular wave output of predetermined duration; means for triggering the said sweep generator coincident with the reception of an energy pulse reflected from the surface of the said medium; means for intensifying the electron beam current of the said cathode ray tube coincident with the reception of energy pulses from within the said medium resulting from reflections of the said transmitting energy pulse from objects below the surface of the said medium; an elongated fiber optic matrix within the said cathode ray tube faceplate, the said matrix being disposed along the sweep axis of the aforementioned electron beam; a luminescent phosphor material covering the inner surface of the said fiber optic matrix, the said phosphor emitting light when excited by the aforementioned electron beam; an elongated paper strip having a photosensitive surface disposed against the outer surface of the said fiber optic matrix so that when the aforementioned electron beam is intensified a spot image is printed on the said paper, the lateral displacement of which is a record of the distance below the surface of a reflecting object within the said medium; and means for moving the said paper strip across the outer surface of the said fiber optic matrix.

4. Apparatus for graphically recording the plan position of energy reflecting objects located below the surface of a medium from above the surface of the medium comprising: means for transmitting a series of highly directional energy pulses into a medium from above the surface of the said medium; means for recording energy pulses from the said medium resulting from reflections of the said transmitted pulses from the surface of the said medium and from objects within the said medium; a cathode ray tube having an elongated faceplate and means for deflecting an electron beam along the axis of the said faceplate in response to a triangular wave; means for laterally scanning the said energy pulse transmitting means; means for generating a triangular wave synchronous with the said lateral scanning means; means for initiating a gate interval of predetermined duration coincident with the reception of an energy pulse reflected from the surface of the said medium; means for intensifying the electron beam current of the said cathode ray tube coincident with the reception of energy pulses from within the said medium during the said gate interval; an elongated fiber optic matrix within the said cathode ray tube faceplate, the said matrix being disposed along the sweep axis of the aforementioned electron beam; a luminescent phosphor material covering the inner surface of the said fiber optic matrix, the said phosphor emitting light when excited by the aforementioned electron beam; an elongated paper strip having a photosensitive surface disposed against the outer surface of the said fiber optic matrix so that when the aforementioned electron beam is intensified a spot image is printed on the said paper, the lateral position of which is a graphic record of the relative plan position of energy reflecting objects beneath the surface of the said medium; and means for moving the said paper strip across the outer surface of the said fiber optic matrix.

References Cited

UNITED STATES PATENTS

| | | | |
|---|---|---|---|
| 3,027,219 | 3/1962 | Bradley. | |
| 3,119,091 | 1/1964 | Hopkin et al. | 340—3 |
| 3,165,024 | 1/1965 | McClure | 343—5 X |

RICHARD A. FARLEY, *Primary Examiner.*

U.S. Cl. X.R.

343—13